United States Patent [19]

Shimamura et al.

[11] Patent Number: 5,662,305
[45] Date of Patent: Sep. 2, 1997

[54] SECURING DEVICE

[75] Inventors: Kunihiko Shimamura, Okayama Prefecture; Shunichi Sato, Saitama Prefecture, both of Japan

[73] Assignee: Velcro Industries B.V., Castorweg, Antilles, Netherlands

[21] Appl. No.: 639,317

[22] Filed: Apr. 24, 1996

Related U.S. Application Data

[63] Continuation of Ser. No. 186,688, Jan. 25, 1994, abandoned.
[51] Int. Cl.⁶ .................................. A47B 97/00
[52] U.S. Cl. .................... 248/500; 224/555; 248/205.2; 248/503
[58] Field of Search .................. 248/205.2, 205.3, 248/201, 499, 500, 503, 174, 680, 357; 206/586; 211/42; 224/311, 901, 555

[56] References Cited

U.S. PATENT DOCUMENTS

| | | | |
|---|---|---|---|
| 2,324,031 | 7/1943 | Schiffenhaus | 206/586 |
| 2,670,122 | 2/1954 | Davidson et al. | 206/586 X |
| 2,899,165 | 8/1959 | James | 248/174 X |
| 3,063,613 | 11/1962 | McClive | 206/586 X |
| 3,648,920 | 3/1972 | Stump | 206/586 X |
| 4,538,737 | 9/1985 | Delaney | 224/42.42 X |
| 4,718,584 | 1/1988 | Schoeny | 224/311 X |
| 4,725,033 | 2/1988 | Zinnecker | 248/499 |
| 4,838,745 | 6/1989 | Haydock | 224/901 X |
| 4,941,784 | 7/1990 | Fament | 224/42.42 X |
| 5,056,752 | 10/1991 | Krause | 248/500 |
| 5,065,922 | 11/1991 | Harris | 248/205.2 X |
| 5,129,612 | 7/1992 | Beaupre | 224/42.42 X |
| 5,215,205 | 6/1993 | Behlman | 224/42.42 X |
| 5,392,972 | 2/1995 | Caruso et al. | 224/311 X |

FOREIGN PATENT DOCUMENTS 570704  7/1945  United Kingdom .................. 211/42

Primary Examiner—Alvin C. Chin-Shue
Assistant Examiner—Derek J. Berger
Attorney, Agent, or Firm—Fish & Richardson P.C.

[57] ABSTRACT

A securing device features a vertical plate portion which folds to conform to an item to be secured, floor attachment plates which fold, relative to the vertical plate portion, and means for releasably affixing the floor attachment plates to the surface on which is placed the item to be secured. One embodiment secures items on carpeted surfaces. Another embodiment secures items on a smooth surface.

9 Claims, 2 Drawing Sheets

SECURING DEVICE

This is a continuation of application Ser. No. 08/186,688, filed Jan. 25, 1994, now abandoned.

BACKGROUND OF THE INVENTION

The invention relates to devices for securing movable or unstable items, e.g., items placed in an automobile trunk or on a carpeted or smooth floor.

Items such as packages loaded in the trunk of an automobile can be hard to secure. Often, they must be arranged carefully to keep them from sliding within the trunk. If not, they can slide, tumble, and break open, scattering the contents which results in damage.

Even in a non-moving environment, movable items can be damaged. For example, movable items in the home or office that do not have anti-skid devices can slide or tumble when someone leans on or stumbles over them.

SUMMARY OF THE INVENTION

In general, in a first aspect, the invention features a securing device for stabilizing items on a smooth or carpeted surface. The securing device includes a vertical plate portion which folds so as to conform to the shape of an item to be secured; two or more floor attachment plates which extend from and fold relative to the vertical plate portion; and means on the floor attachment plates for releasably affixing the floor attachment plates to the surface.

Embodiments of the invention may include one or more of the following features. The vertical plate portion folds about one or more vertical hinge lines, which can be creases in the vertical plate portion. The floor attachment plates fold, relative to the vertical plate portion, about horizontal hinge lines, which can be creases as well.

The means for affixing the floor attachment plates to the surface can be a touch fastener component, such as a hook-type fastener with hook-like gripping elements. Such means are used for securing items placed on a carpeted surface. Alternatively, the means for affixing the floor attachment plates to the surface can be a pressure sensitive adhesive. Such means are used for securing items placed on a smooth surface.

The securing device can be made from various materials, including synthetic resins such as thermosetting and thermoplastic materials.

In general, in another aspect, the invention features securing an item on a surface. A securing device with a vertical plate portion and two or more floor attachment plates extending from the vertical plate portion is provided. The floor attachment plates have means for releasably affixing the floor attachment plates to the surface. The vertical plate portion is folded to conform to the item being secured, the floor attachment plates are folded relative to the vertical plate portion, the vertical plate portion is placed against the item, and the means for affixing the floor attachment plates are pressed against the surface to affix the floor attachment plates to the surface.

In one embodiment of the invention, the surface on which the item is secured is carpeted and the means for affixing the floor attachment plates is a hook-type fastener component of a hook and loop touch fastener. In an alternative embodiment of the invention, the surface on which the item is secured is smooth and the means for affixing the floor attachment plates is pressure sensitive adhesive.

The invention provides a device for securing movable and unstable items in an automobile trunk or on a carpeted or smooth floor. The device, which is easily manufactured, can secure items of many different shapes. It can easily and repeatedly be attached to and removed from many different locations.

Other advantages and features will be apparent from what follows.

DESCRIPTION

Figure 3A:
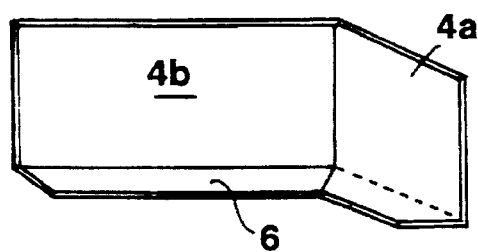
Figure 3B:
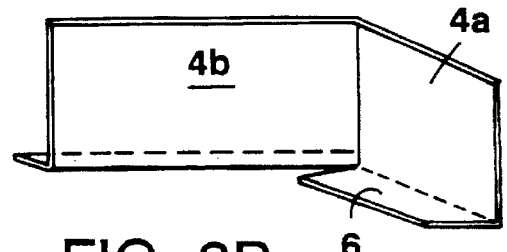
Figure 3C:
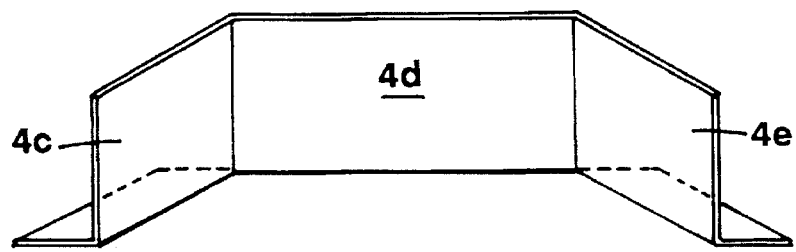

FIGS. 3A, 3B, and 3C are perspective views of various configurations of a securing device.

Figure 4:
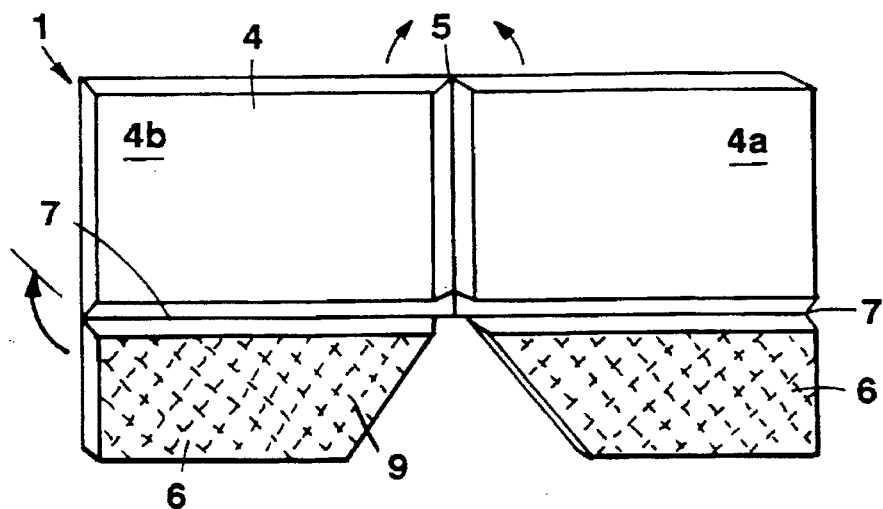

FIG. 4 is a perspective view of an alternative embodiment of a securing device.

Figure 1:
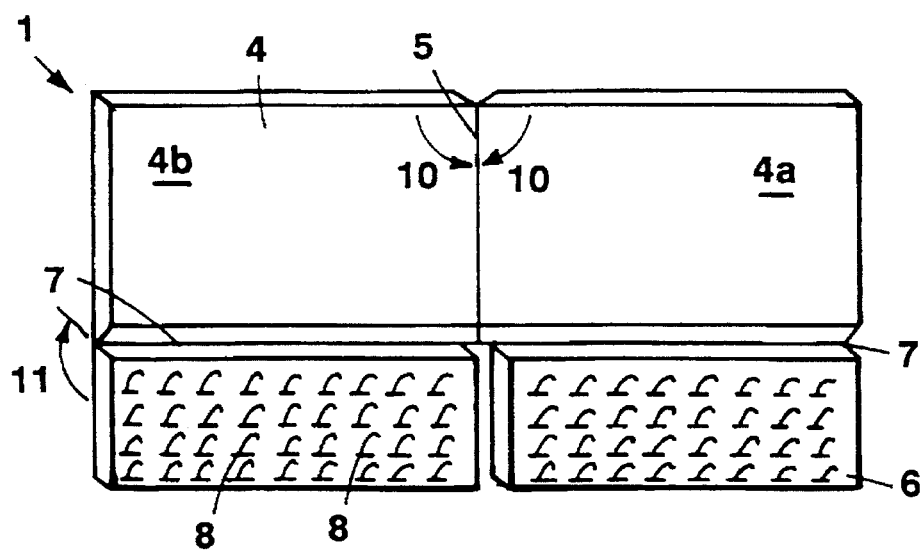
FIG. 1 is a perspective view of a securing device.

A securing device 1 (FIG. 1) has a vertical plate portion 4 with a vertical hinge line 5, such as a notch-like crease in the vertical plate portion. (Although the invention will be described using the terms "vertical" and "horizontal," these terms are for descriptive purposes only and are not intended to limit the invention to these or other generally perpendicular orientations.) The vertical hinge line is located at a desired horizontal position on the vertical plate portion. The vertical hinge line allows the vertical plate portion to be folded, as indicated by arrows 10, by an amount which does not exceed 180°.

Two floor attachment plates 6 extend from the bottom of the vertical plate portion, one from each of the two subsections 4a, 4b of the vertical plate portion. The floor attachment plates fold outward about horizontal hinge lines 7, in the direction of arrow 11, to form approximately right angles relative to the vertical plate portion. The horizontal hinge lines may be creases, similar to the vertical hinge line. One component of a touch fastener, such as the hook component 8 of a hook and loop fastener, is attached to the surfaces of the floor attachment plates which will face the floor when the securing device is used.

Figure 2:
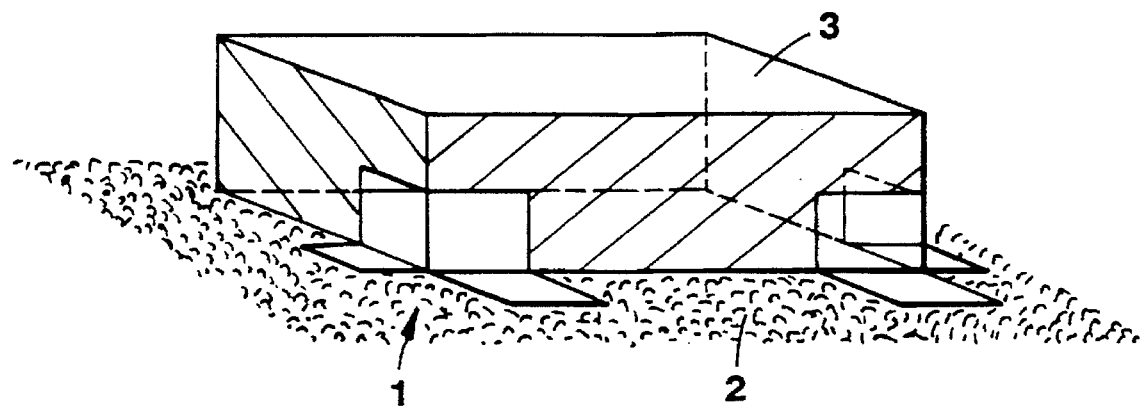
FIG. 2 is a perspective view of an item secured by the securing device of FIG. 1.

As shown in FIG. 2, the securing device 1 is used to secure an item 3 placed on a carpeted surface 2, e.g., the bottom of an automobile trunk, by folding the vertical plate portion about the vertical hinge line such that it conforms to the item being secured. The floor attachment plates are folded outward, the vertical plated portion is placed against the item, and the fastener-covered surfaces are pressed against the carpeted surface so as to engage the pile elements of the carpet. The item is now secured.

The securing device can be manufactured so as to secure items of various different shapes by making the vertical plate portion and floor attachment plates fold in varying directions (FIGS. 3A and 3B). The direction in which the vertical plate portion or floor attachment plates fold is changed simply by changing the location of the vertical or horizontal hinge lines to the opposite side of the device.

The securing device can also be manufactured with more than one vertical hinge line (FIG. 3C). This results in the vertical plate portion having more subsections 4c, 4d, 4e, so that it can conform to items with more complex shapes. It is still only necessary, however, to have two floor attachment plates, which should be attached to the outermost subsections of the vertical plate portion. More floor attachment plates can be provided, however, if so desired.

The securing device can be made from any of a number of different materials, although synthetic resins typically used for molding are preferred. Such resins include thermoplastic resins—e.g., polyolefin or olefin copolymer such as polyethylene or polypropylene, polystyrene or styrene copolymer, or polyvinyl chloride or vinyl chloride copolymer—and thermosetting resins. When the securing device is made from a synthetic resin, it may be desirable to mold synthetic or regenerated fiber or woven or non-woven fabric into the hinge line areas to reinforce these areas against repeated folding. Wood, processed wood, metal plate, or processed metal plate can be used to make the securing device as well.

Many different types of hook fasteners can be used on the floor attachment plates of the securing device. Examples of possible fasteners include woven hook- or woven mushroom-type fasteners. The gripping elements of such fasteners can be made by reweaving synthetic fabric such as polyester fabric, polyamide fabric, polyolefin fabric, or vinyl chloride fabric. Molded plastic hook fasteners can be used as well. Examples of molded plastic hooks are disclosed in U.S. Pat. Nos. 4,872,243, 4,794,028, and 4,775,310, all to Fischer, and U.S. Pat. No. 4,984,339 to Provost, all of which are incorporated by reference. Possible plastics include thermoplastic resins—e.g., polyesters, polyamides, polyolefins, vinyl chloride copolymers, or polyurethanes—and thermosetting resins.

In an alternative embodiment of a securing device (FIG. 4), pressure sensitive adhesive 9 is used on the floor attachment plates 6 instead of a hook fastener component. This allows the securing device to be used on smooth floors.

The adhesive should be one which sticks to the floor easily. It should be easily removed from the floor, without leaving traces, and it should retain its tackiness after repeated use.

A preferred adhesive is made by applying plasticizer, tacky resin, and tackiness adjuster to a substrate, along with a polyurethane polymer having the soft segment made from polyisoprene or isoprene butadiene copolymer in which 50% of the unsaturation is replaced by hydrogen. Such an adhesive has a tackiness of 10 to 1000 g/cm and a shearing stress of 0.5 to 4.0 kg/cm, as measured against stainless steel plate. Its tackiness is enhanced when water is added to the surface against which it is to be pressed, e.g., a smooth floor.

Other embodiments of a securing device are within the scope of the invention. For example, rather than molding a crease into the vertical plate portion and/or the floor attachment plates, conventional, barrel-and-pin-type hinges, such as are used to mount swinging doors, can be used as well. When the securing device is made from molded plastic, hook elements can be molded integrally with the floor attachment plates. If the surface on which is placed the item to be secured has hook-like or barb-like projections, loop fastener members can be used on the floor attachment plates instead of hook fastener members.

What is claimed is:

1. A relatively small, selectively positionable and readily releasable corner securing device for stabilizing an item placed on a relatively broad surface having carpet-type pile elements, comprising a vertical plate portion comprising at least two panels joined to each other at a flexible vertical hinge joint which enables folding of said panels relative to one another about a vertical axis thereby to enable said vertical plate portion to conform adjustably to the local shape of a selected item to be secured, two or more floor attachment plates, each joined to the lower edge of a different one of said panels at a flexible horizontal hinge joint enabling folding of said attachment plate relative to the respective panel in the manner that each attachment plate is directed away from said item while the lower surface of each plate is exposed directly to said broad surface, and means in the form of touch fastener hook-type gripping elements capable of engaging carpet-type pile elements on said lower surface of each of said floor attachment plates for releasably affixing each of said floor attachment plates to carpet-type pile elements on said surface.

2. The securing device of claim 1 wherein said panels of said plate portion are integral parts of a unitary structure and said vertical hinge joint comprises a crease in said unitary structure.

3. The securing device of claim 1 wherein at least one of said floor attachment plates is integral with its respective panel and said horizontal hinge joint between said plate and panel comprises a crease.

4. The securing device of claim 1 wherein said gripping elements comprise woven hooks.

5. The securing device of claim 1 wherein said gripping elements comprise molded plastic hooks.

6. The securing device of claim 1 wherein said securing device is made from synthetic resin.

7. The securing device of claim 6 wherein said synthetic resin comprises a thermoplastic material.

8. The securing device of claim 6 wherein said synthetic resin comprises a thermosetting material.

9. A method for securing an item on a surface comprising carpeting, comprising providing a relatively small, selectively positionable corner securing device, said corner securing device comprising a vertical plate portion comprising at least two panels joined to each other at a flexible vertical hinge joint which enables folding of said panels relative to one another about a vertical axis thereby to enable said vertical plate portion to conform adjustably to the local shape of a selected item to be secured, two or more floor attachment plates, each joined to the lower edge of a different one of said panels at a flexible horizontal hinge joint enabling folding of said attachment plate relative to the respective panel in the manner that each attachment plate is directed away from said item while the lower surface of each plate is exposed directly to said surface, and means in the form of touch fastener hook-type gripping elements capable of engaging carpet-type pile elements on said lower surface of each of said floor attachment plates for releasably affixing each of said floor attachment plates to carpet-type pile elements of said carpeting on said surface;

folding said vertical plate portion at said vertical hinge joint to conform to said item;

folding said two or more floor attachment plates relative to said vertical plate portion at said horizontal hinge joint in a position directed away from said item; and placing said vertical plate portion against said item and pressing said means for affixing against said surface to affix said floor attachment plates to said surface.

* * * * *

UNITED STATES PATENT AND TRADEMARK OFFICE
CERTIFICATE OF CORRECTION

PATENT NO. : 5,662,305
DATED      : September 2, 1997
INVENTOR(S): Kunihiko Shimamura et al.

It is certified that error appears in the above-identified patent and that said Letters Patent is hereby corrected as shown below:

On the title page item [75], change the inventors first name from "Shunichi" to read --Shun'ichi--.

Signed and Sealed this

Second Day of February, 1999

Attest:

Attesting Officer

*Acting Commissioner of Patents and Trademarks*